UNITED STATES PATENT OFFICE.

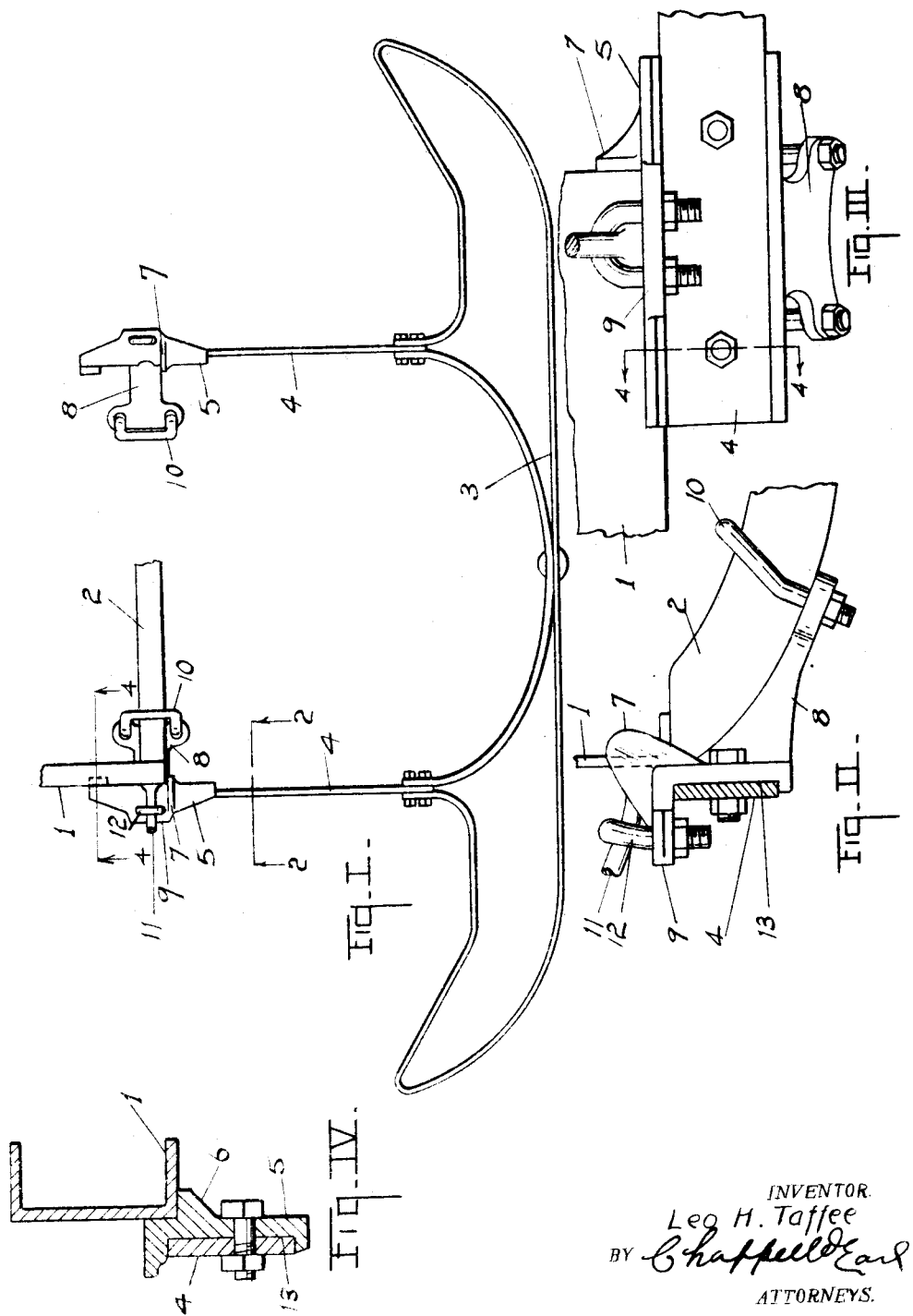

LEO H. TAFFEE, OF HASTINGS, MICHIGAN, ASSIGNOR TO HASTINGS MANUFACTURING COMPANY, OF HASTINGS, MICHIGAN.

BUMPER FOR AUTOMOBILES.

1,365,746.  Specification of Letters Patent.  Patented Jan. 18, 1921.

Application filed November 18, 1920. Serial No. 424,947.

*To all whom it may concern:*

Be it known that I, LEO H. TAFFEE, a citizen of the United States, residing at Hastings, in the county of Barry and State of Michigan, have invented certain new and useful Improvements in Bumpers for Automobiles, of which the following is a specification.

This invention relates to improvements in bumpers for automobiles.

The main objects of this invention are to provide in a bumper an improved attaching means.

A further object is to provide an improved attaching means for bumpers which enable the attaching of the bumpers to an automobile, such as a "Ford," without change or modification of the vehicle.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a plan view of bumpers embodying the feature of my invention, only such parts of a motor vehicle being shown as are necessary to show an application of my invention, the parts shown being conventionally illustrated.

Fig. II is a detail section on a line corresponding to 2—2 of Fig. I.

Fig. III is a detail side elevation showing the relations of the attaching bracket to the frame.

Fig. IV is a detail section on a line corresponding to line 4—4 of Fig. I, and Fig. III.

In the drawing similar reference characters refer to similar parts throughout the several views, and the sectional views are taken looking in the direction of the little arrows at the ends of the section lines.

Referring to the drawing, 1 represents a longitudinal sill or side member and 2 the front cross member of a "Ford" automobile frame. The bumper is designated generally by the numeral 3 and is provided with bar-like supporting arms 4. These arms are secured to the frame by the attaching brackets 5 disposed at the outer sides of the longitudinal members of the frame as shown in Fig. IV.

The bracket members are provided with inwardly projecting lugs 6 which engage the under sides of the longitudinal frame members and with upwardly and inwardly projecting lugs 7 which engage the ends of the frame member.

The bracket members are also provided with inwardly projecting arms 8 and outwardly projecting arms 9.

The inwardly projecting arms 8 are disposed below the cross member 2 and are clamped against the under side thereof by the U-bolt 10. The arms 9 of the bracket members are disposed below the lamp brackets 11 and are secured thereto by the U-bolt 12. With the parts thus arranged, the brackets may be easily mounted on the vehicle frame without any change or modification thereof and they are very secure.

The bumper is supported in such a manner that it will withstand the severe shocks and strains to which it may be subjected in use.

The bracket is provided with a channel 13 on its outer side in which the arms 4 are arranged.

Having thus described my invention, what I claim as new and desire to secure by Letters Patent, is:

1. The combination with the frame of an automobile comprising a longitudinal member and a cross member disposed at the front end of said longitudinal member, and an outwardly projecting lamp bracket, of a bumper, a supporting arm therefor, an attaching bracket for said arm disposed on the outer side of said longitudinal member and having an inwardly projecting lug on its inner side engaging the under side of said longitudinal member and an upwardly and inwardly projecting lug engaging the front end of said longitudinal member and an inwardly projecting arm on its inner side disposed below said cross frame member and an outwardly projecting arm disposed below said lamp bracket, a U-bolt clamping said inwardly projecting arm to the under side of said cross frame member, and a U-bolt carried by said outwardly projecting arm engaging said lamp bracket, said bracket being channeled on its outer side to receive said arm.

2. The combination with the frame of an automobile comprising a longitudinal member and a cross member disposed at the front end of said longitudinal member, and an outwardly projecting lamp bracket, of a bumper, an attaching bracket for said bumper disposed on the outer side of said longitudinal member and having an inwardly projecting lug on its inner side engaging the under side of said longitudinal member, and an upwardly and inwardly projecting lug engaging the front end of said longitudinal member, and an inwardly projecting arm on its inner side disposed below said cross frame member, and an outwardly projecting arm disposed below said lamp bracket, a U-bolt clamping said inwardly projecting arm to the under side of said cross frame member, and a U-bolt carried by said outwardly projecting arm engaging said lamp bracket.

3. The combination with the frame of an automobile comprising a longitudinal member and a cross member disposed at the front end of said longitudinal member, and an outwardly projecting lamp bracket, of a bumper, an attaching bracket for said arm disposed on the outer side of said longitudinal member and having a lug engaging the under side of said longitudinal member and a lug engaging the front end of said longitudinal member, an inwardly projecting arm disposed below said cross frame member and an outwardly projecting arm disposed below said lamp bracket, a U-bolt clamping said inwardly projecting arm to the under side of said cross frame member, and a U-bolt carried by said outwardly projecting arm engaging said lamp bracket.

In witness whereof, I have hereunto set my hand and seal in the presence of two witnesses.

LEO H. TAFFEE. [L. S.]

Witnesses:
ABEN E. JOHNSON,
MARGARET McCALL.